(12) United States Patent
Shen et al.

(10) Patent No.: US 11,066,022 B1
(45) Date of Patent: Jul. 20, 2021

(54) POSITIONING CLAMP AND CARRIER USING THE SAME

(71) Applicant: KING ROOF INDUSTRIAL CO., LTD., Taichung (TW)

(72) Inventors: Shih-Chieh Shen, Taichung (TW); Chun-Yi Hsieh, Taichung (TW)

(73) Assignee: KING ROOF INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 16/841,137

(22) Filed: Apr. 6, 2020

(51) Int. Cl.
*B60R 9/06* (2006.01)
*B60R 9/10* (2006.01)

(52) U.S. Cl.
CPC . *B60R 9/06* (2013.01); *B60R 9/10* (2013.01)

(58) Field of Classification Search
CPC .... B60R 9/06; B60R 9/00; B60R 9/04; B60R 9/10; B25H 5/00; B60D 1/36; B60D 1/40; Y10T 403/32467; Y10T 403/32532
See application file for complete search history.

(56) References Cited

U.S. PATENT DOCUMENTS

| | | | | |
|---|---|---|---|---|
| 2,503,738 A | * | 4/1950 | Horton | F16B 7/1472 403/362 |
| 3,837,679 A | * | 9/1974 | Dickmann | B60D 1/52 280/491.5 |
| 4,050,714 A | * | 9/1977 | Epp | B60D 1/06 280/495 |
| 4,080,080 A | * | 3/1978 | Cisler | A47B 9/14 248/188.5 |
| 4,185,936 A | * | 1/1980 | Takahashi | F16B 7/1454 16/DIG. 39 |
| 4,596,484 A | * | 6/1986 | Nakatani | F16B 7/1454 248/188.5 |
| 4,603,878 A | * | 8/1986 | Smith, Jr. | B60D 1/50 267/138 |
| 4,744,690 A | * | 5/1988 | Hsieh | F16B 7/1418 248/411 |
| 4,761,092 A | * | 8/1988 | Nakatani | F16B 7/1454 248/188.5 |
| 5,423,566 A | * | 6/1995 | Warrington | B60D 1/52 224/521 |
| 5,593,172 A | * | 1/1997 | Breslin | B60D 1/155 280/491.5 |
| 5,727,805 A | * | 3/1998 | La Roque | B60D 1/155 280/478.1 |
| 5,897,087 A | * | 4/1999 | Farley | A61B 17/02 248/229.21 |
| 5,988,667 A | * | 11/1999 | Young | B60D 1/155 280/506 |

(Continued)

FOREIGN PATENT DOCUMENTS

| TW | M538892 U | 4/2017 |
|---|---|---|
| TW | M553698 U | 1/2018 |
| TW | I642573 B | 12/2018 |

*Primary Examiner* — Brian D Nash
(74) *Attorney, Agent, or Firm* — Muncy, Geissler, Olds & Lowe, P.C.

(57) ABSTRACT

A positioning clamp of the present invention includes a tightening body and a fastening assembly. The tightening body includes an insertion hole. Two ends of the tightening body are spacedly arranged. The fastening assembly is disposed on the tightening body and is movable between a fastening position and a release position.

9 Claims, 12 Drawing Sheets

(56) References Cited

U.S. PATENT DOCUMENTS

| | | | | |
|---|---|---|---|---|
| 6,010,144 | A * | 1/2000 | Breslin | B60D 1/155 280/491.5 |
| 6,017,009 | A * | 1/2000 | Swartz | A47B 57/10 108/147.13 |
| 6,032,914 | A * | 3/2000 | Bastida | A47B 9/14 248/188.5 |
| 6,105,989 | A * | 8/2000 | Linger | B60D 1/241 280/506 |
| 6,142,502 | A * | 11/2000 | Breslin | B60D 1/155 280/491.5 |
| 6,142,699 | A * | 11/2000 | Pao | F16B 7/1454 403/109.5 |
| 6,406,051 | B1 * | 6/2002 | Phillips | B60D 1/145 280/491.1 |
| 6,502,845 | B1 * | 1/2003 | Van Vleet | B60D 1/155 280/491.1 |
| 6,732,984 | B2 * | 5/2004 | Tsai | A47F 5/0006 211/17 |
| 7,004,491 | B1 * | 2/2006 | Allsop | B60D 1/52 280/506 |
| 7,467,804 | B2 * | 12/2008 | Ezra | B60D 1/52 280/506 |
| 7,717,455 | B2 * | 5/2010 | Morris | B60D 1/52 280/506 |
| 8,079,612 | B1 * | 12/2011 | Tambornino | B60D 1/241 280/506 |
| 8,702,339 | B2 * | 4/2014 | Ballentine | F16B 7/1454 403/322.4 |
| D706,179 | S * | 6/2014 | Pochurek | D12/162 |
| 9,981,513 | B2 * | 5/2018 | Belinky | B60D 1/605 |
| 10,046,612 | B1 * | 8/2018 | Garcia | B60D 1/52 |
| 10,220,661 | B1 * | 3/2019 | Gebheim | B60D 1/241 |
| 2007/0187447 | A1 * | 8/2007 | Hamann | B60R 9/10 224/519 |
| 2009/0115165 | A1 * | 5/2009 | Coy | B60D 1/241 280/506 |
| 2010/0135716 | A1 * | 6/2010 | Shalaby | B62K 27/12 403/110 |
| 2013/0062380 | A1 * | 3/2013 | Maenle | A01B 23/02 224/401 |
| 2015/0076793 | A1 * | 3/2015 | Belinky | B60D 1/241 280/506 |
| 2015/0093182 | A1 * | 4/2015 | Wu | F16B 7/105 403/109.6 |
| 2016/0039350 | A1 * | 2/2016 | Patel | B60R 9/04 224/324 |
| 2016/0280022 | A1 * | 9/2016 | Vernersson | B60D 1/145 |
| 2020/0171895 | A1 * | 6/2020 | Corns | B60D 1/167 |

* cited by examiner

POSITIONING CLAMP AND CARRIER USING THE SAME

BACKGROUND OF THE INVENTION

Field of the Invention

The present invention relates to a carrier, more especially to a positioning clamp for carrier and a carrier having the positioning clamp.

Description of the Prior Art

To carry bicycles or other small vehicles with the cars, a carrier shown in patents TW I642573, TW M553698, and TW M538892 is usually utilized.

The connecting rod of the carrier is inserted into the tube body of the vehicle, and the connecting rod and the tube body are engaged by a pin.

However, to insert the pin, the first hole of the connecting rod and the second hole of the tube body have to overlap. Thus, it is inconvenient that the user has to adjust the positions of the connecting rod several times.

SUMMARY OF THE INVENTION

The main object of the present invention is to provide a positioning clamp and a carrier including the positioning clamp. When the carrier is installed on a vehicle body at the first time, the user can notice the overlapping length of the connecting rod and the tube body to facilitate the installation later on.

To achieve the above and other objects, the positioning clamp of the present invention is for being disposed on a connecting rod of a carrier. The connecting rod is adapted for connecting to a tube body of a vehicle body. The positioning clamp includes a tightening body and a fastening assembly.

The tightening body extends along a surrounding direction and encloses an insertion hole. The insertion hole is adapted for the connecting rod to movably insert through. Two free ends of the tightening body are spacedly arranged along the surrounding direction so that a gap is formed between the two free ends of the tightening body. The gap provides the tightening body elasticity and deformability. The fastening assembly is disposed on the tightening body and is movable between a fastening position and a release position. When the fastening assembly is moved toward the fastening position, the two free ends of the tightening body are driven to approach each other so that the connecting rod is tightened by the tightening body. When the fastening assembly is moved toward the release position, the two free ends of the tightening body move apart so that the connecting rod is released from the tightening rod.

To achieve the above and other objects, the carrier of the present invention includes a connecting rod, the positioning clamp mentioned above, a main rack, and a carrying assembly.

The connecting rod is adapted for connecting to a tube body of a vehicle body. The positioning clamp is movably sleeved onto the connecting rod. The main rack is connecting to the connecting rod. The carrying assembly is disposed on the main rack and is adapted for restrict a vehicle to carry.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
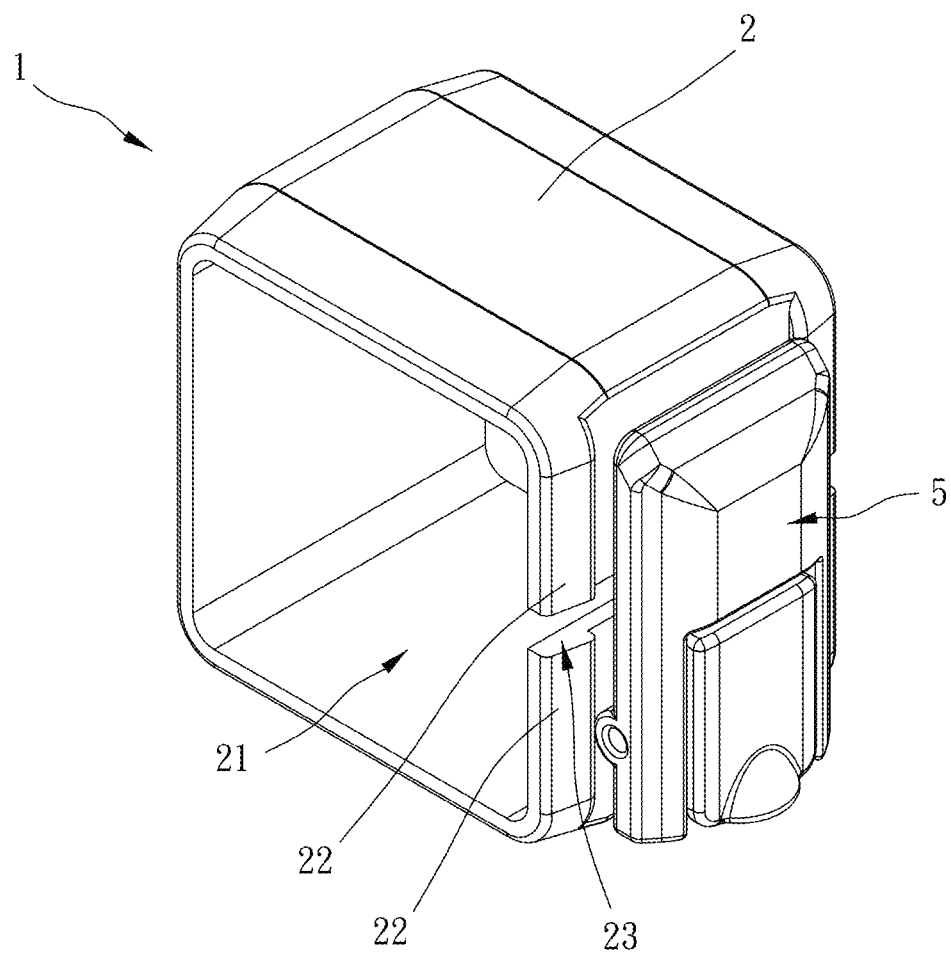
FIG. 1 is a stereogram showing a first embodiment of the present invention.
Figure 2:
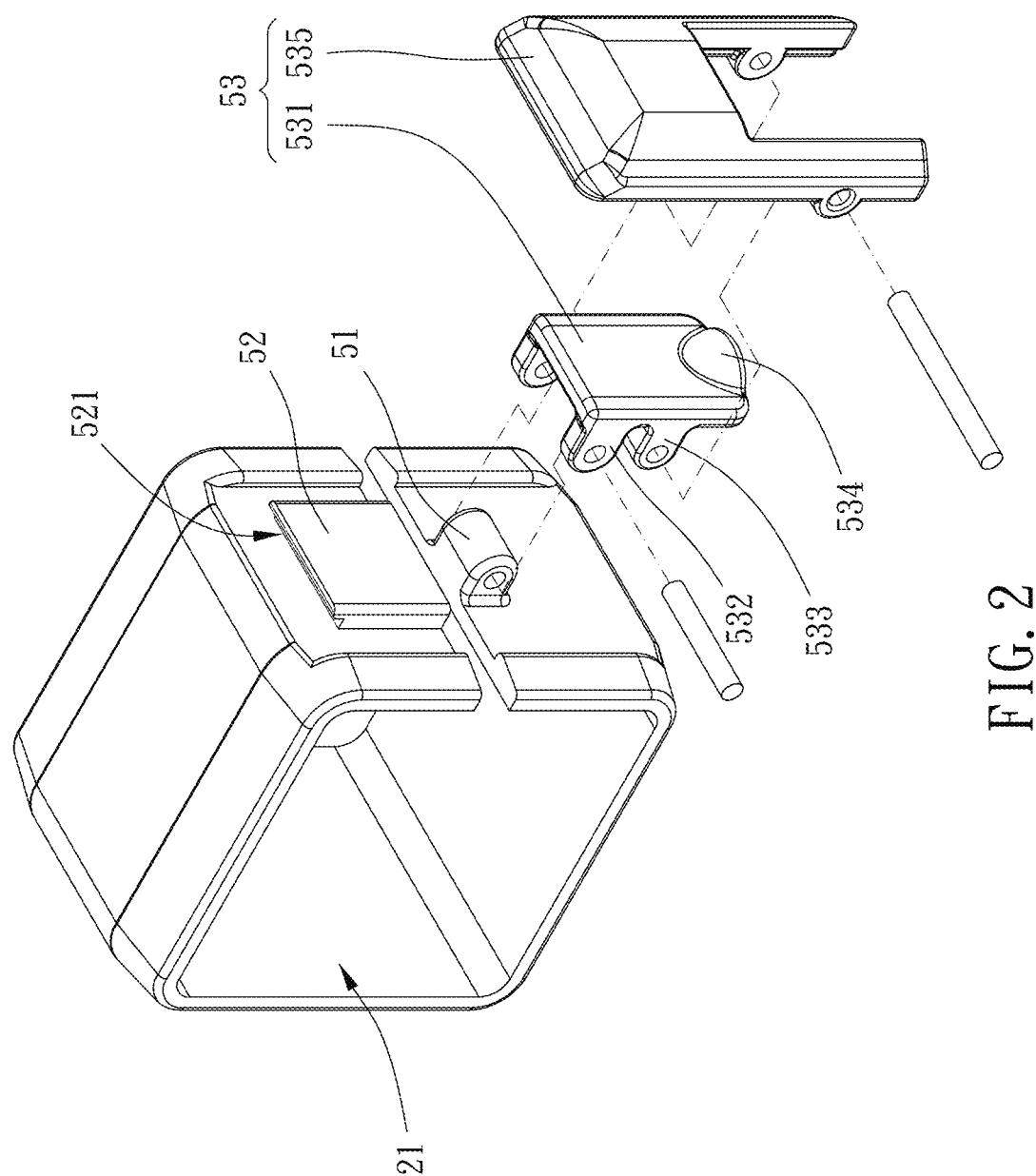
FIG. 2 is a breakdown drawing showing a first embodiment of the present invention.
Figure 3:
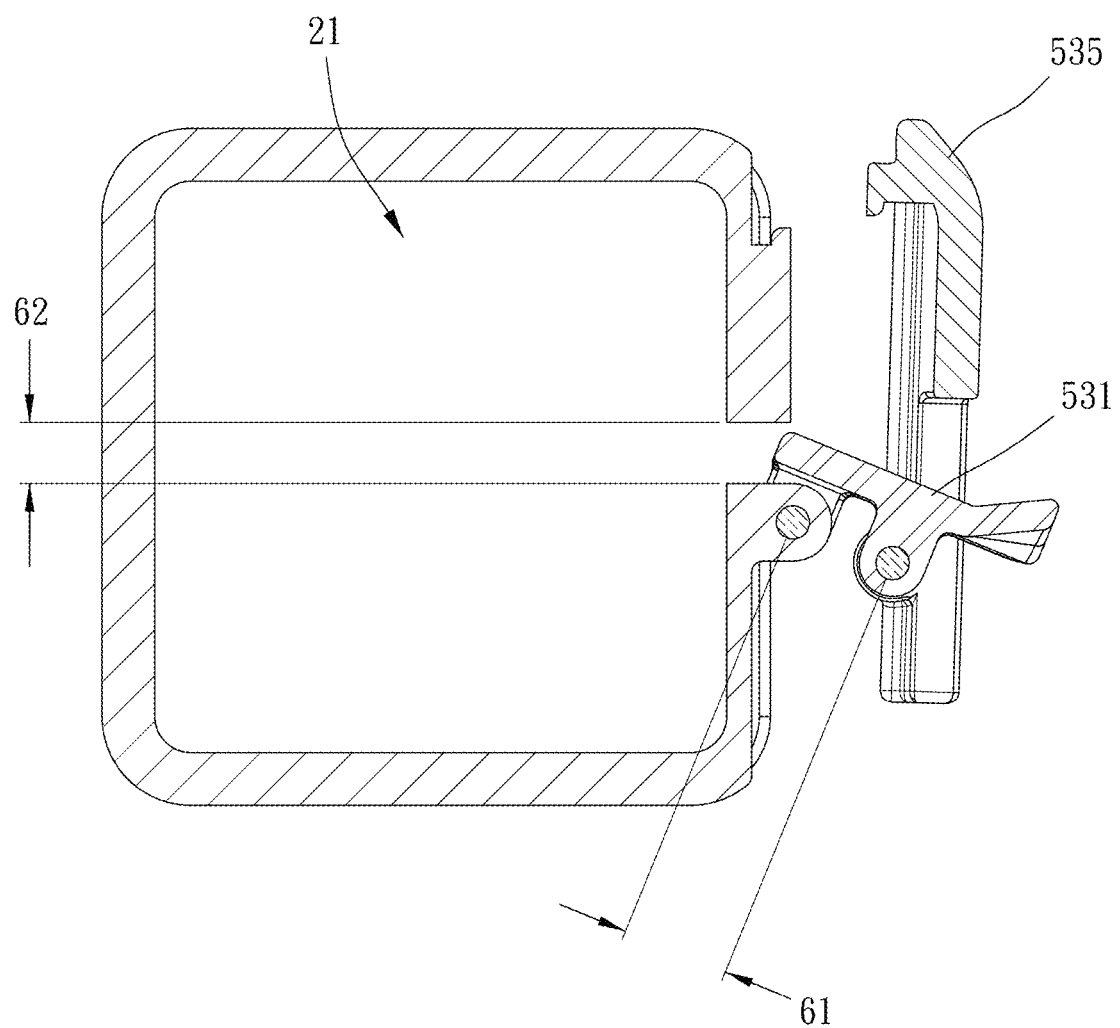
FIG. 3 to FIG. 5 are profiles showing a first embodiment of the present invention during operation.
Figure 4:
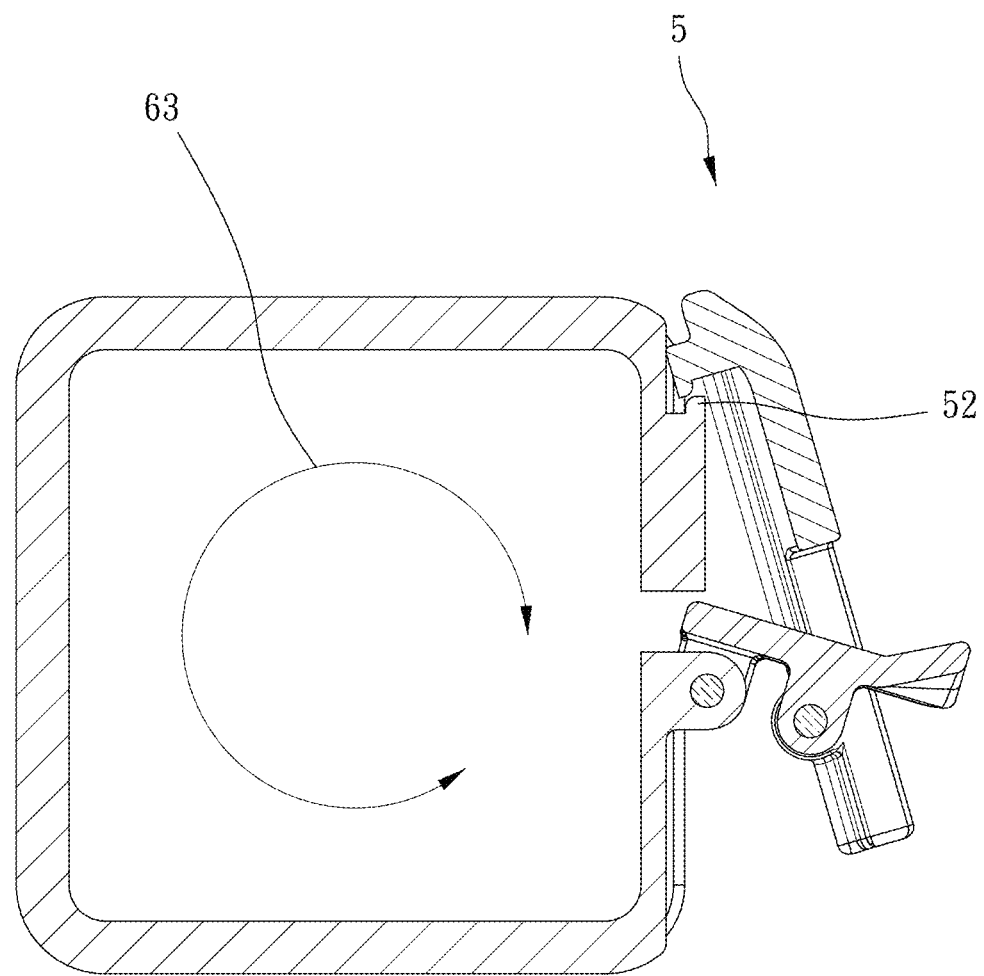
Figure 5:
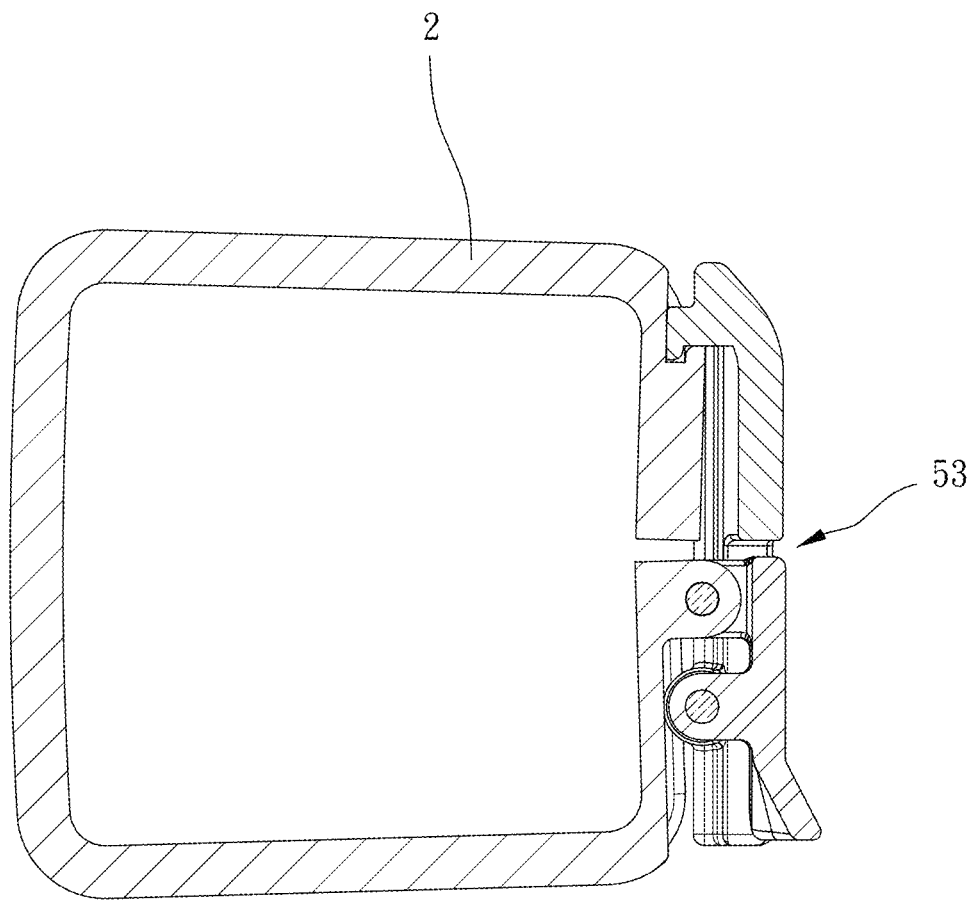

Please refer to FIG. 1 to FIG. 8 for the first embodiment of the present invention, the positioning clamp 1 is for being disposed on a connecting rod 72 of a carrier 71. The connecting rod 72 is adapted for connecting to a tube body 751 of a vehicle body 75. The positioning clamp 1 includes a tightening body 2 and a fastening assembly 5.

Specifically, the tightening body 2 extends along a surrounding direction 63 to encloses an insertion hole 21. The insertion hole 21 is adapted for the connecting rod 72 to movably insert through in order to adjust the position. Besides, along the surrounding direction 63, the two free ends 22 of the tightening body 2 are spacedly arranged so that a gap 23 is defined between the two free ends 22. The gap 23 provides the tightening body 2 elasticity and deformability.

More specifically, the fastening assembly 5 is disposed on the tightening body 2 and is movable between a fastening position and a release position. When the fastening assembly 5 is moved toward the fastening position, the two free ends 22 are driven to approach each other so that the tightening body 2 deforms to tighten the connecting rod 72. When the fastening assembly 5 is moved toward the release position, the two free ends 22 are driven to move apart from each other so that the connecting rod 72 is not tightened by the tightening body 2.

In use, the fastening assembly 5 is switched into the release position first, and make the positioning clamp 1 sleeve onto the connecting rod 72. And then, insert the connecting rod 72 into the tube body 751 to engage them. After assembling, move the positioning clamp 1 to make it abut against the tube body 751. The insertion length of the connecting rod 72 can be acquired from the position of the positioning clamp 1. Thereafter, switch the fastening assembly 5 into the fastening position to make the positioning clamp 1 be fixed on the connecting rod 72. When the user uses the carrier 71 next time, the user just has to move the connecting rod 72 to make the positioning clamp 1 abut against the tube body 751. That is, the user has to adjust the insertion length of the connecting rod 72 at the first use.

The fastening assembly 5 preferably includes a pivot seat 51, a coupling portion 52, and a buckling assembly 53. The pivot seat 51 is disposed on one of the free ends 22, and the coupling portion 52 is disposed on the other one of the free ends 22. The buckling assembly 53 is pivotally connected to the pivot seat 51 so that the buckling assembly 53 is selectively coupled with the coupling portion 52 across the gap 23. The fastening position is defined at a situation that the buckling assembly 53 is coupled with the coupling portion 52, and the release position is defined at a situation that the buckling assembly 53 is released from the coupling portion 52. More specifically, the coupling portion 52 is formed with a coupling groove 521 at a side thereof opposite to the gap 23. A part of the buckling assembly 53 is selectively embedded into the coupling groove 521 to make the two free ends 22 approach each other. Thus, the tightening body 2 is deformed to clamp the connecting rod 72 for fixation.

At the first embodiment, the buckling assembly 53 includes a control member 531 and a buckling member 535. The control member 531 has a first pivot arm 532 and a second pivot arm 533. The first pivot arm 532 is pivotally connected to the pivot seat 51, and the second pivot arm 533 is pivotally connected to the buckling member 535. Thereby, the buckling member can be controlled to couple with the coupling portion 52 or to be released from the coupling portion 52 by the control member 531. Specifically, the first pivot arm 532 is located between the second pivot arm 533 and the coupling portion 52. More specifically, a distance between a pivot axis of the first pivot arm 532 and a pivot axis of the second pivot arm 533 is defined as a first distance 61, and a minimum distance between the two free ends 22 before deformation is defined as a second distance 62. The second distance 62 is 0.55-0.7 time the first distance 61.

Preferably, the control member 531 further has a pulling portion 534 for being pulled to make the control member 531 pivot. Specifically, the second pivot arm 533 is located between the pulling portion 534 and the first pivot arm 532.

Figure 6:
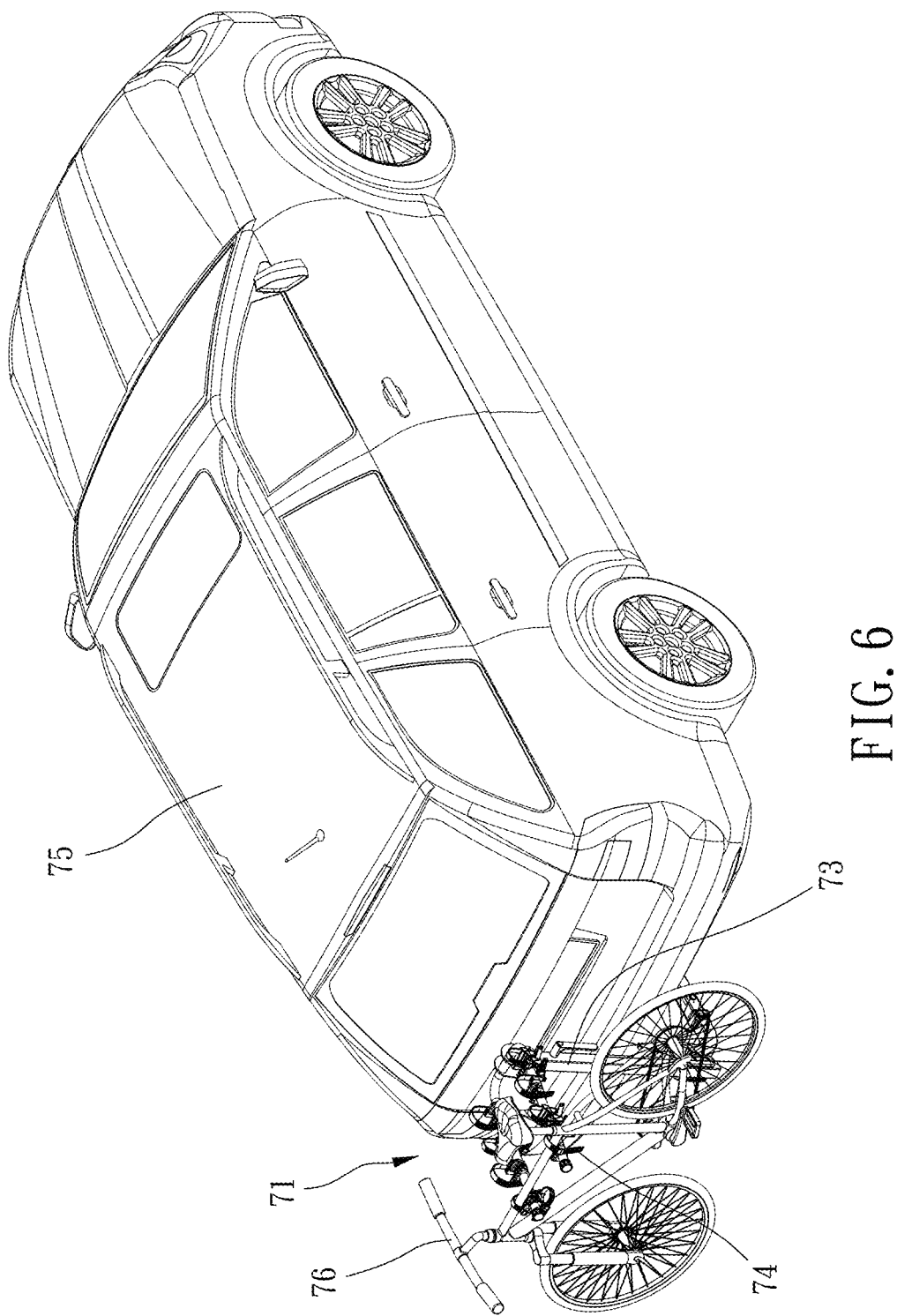
FIG. 6 is an illustration showing a first embodiment of the present invention.
Figure 7:
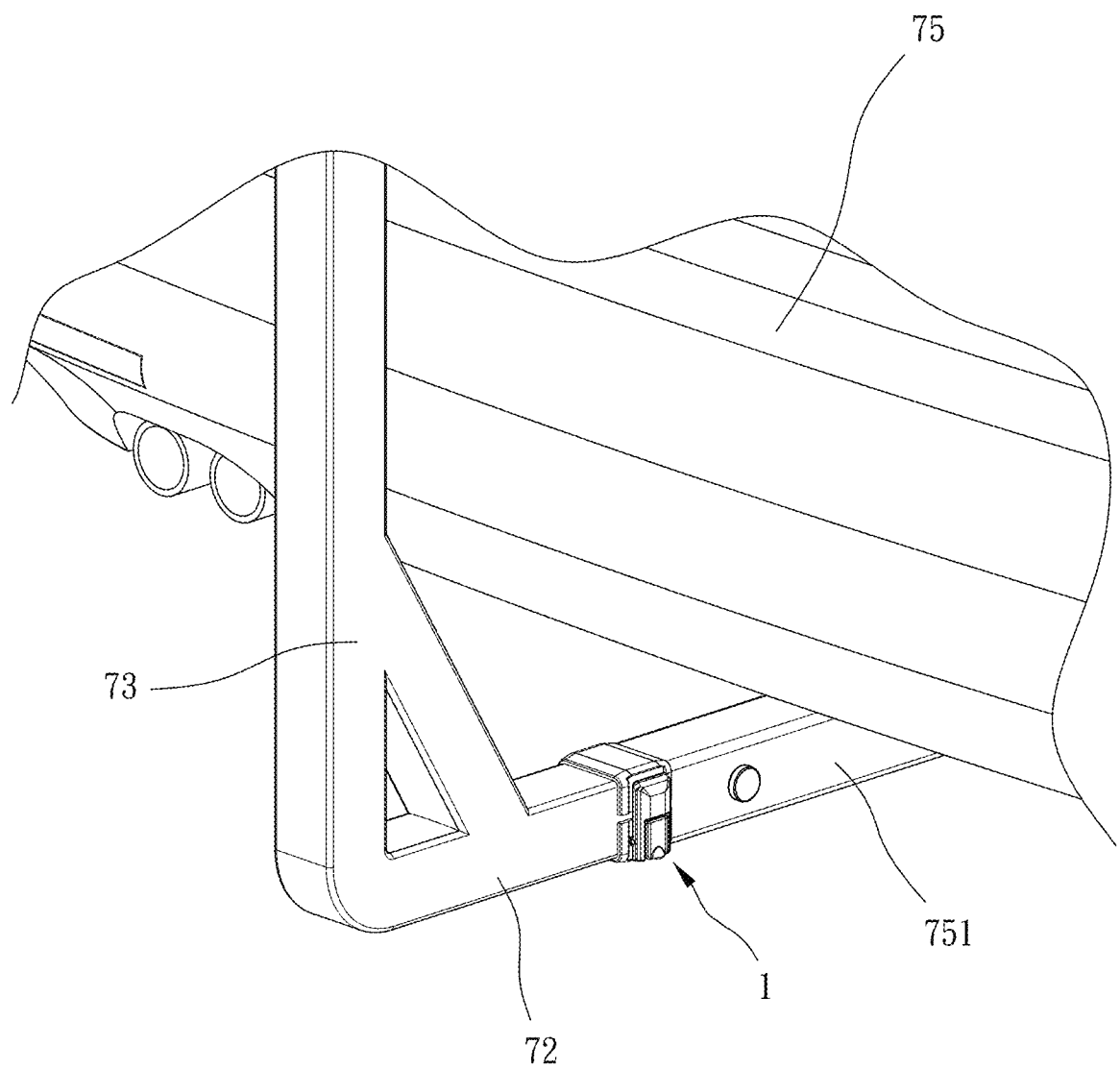
FIG. 7 is a partial enlargement of FIG. 6.
Figure 8:
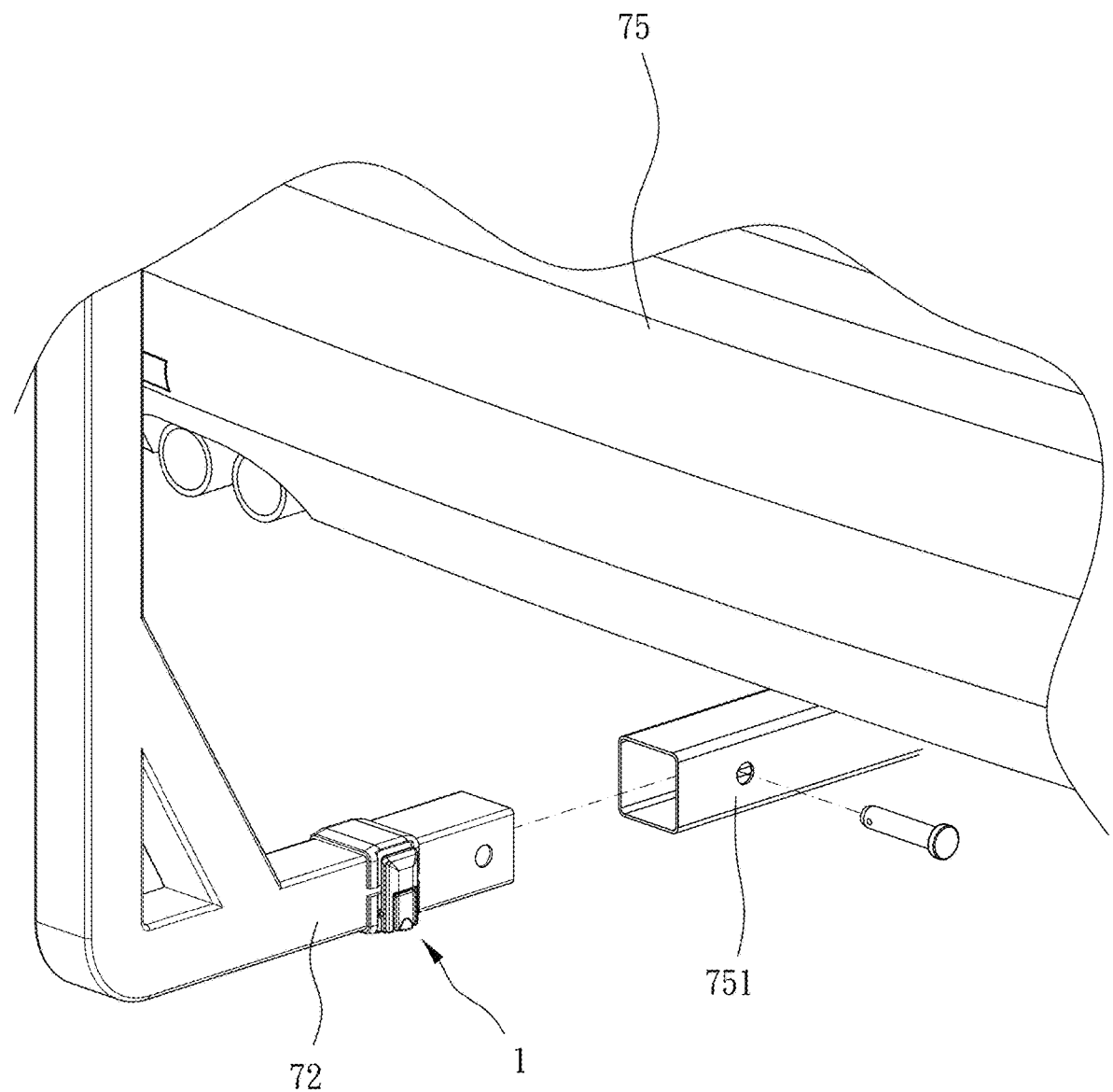
FIG. 8 is an illustration showing a first embodiment of the present invention when a connecting rod is separated from a tube body.
Figure 9:
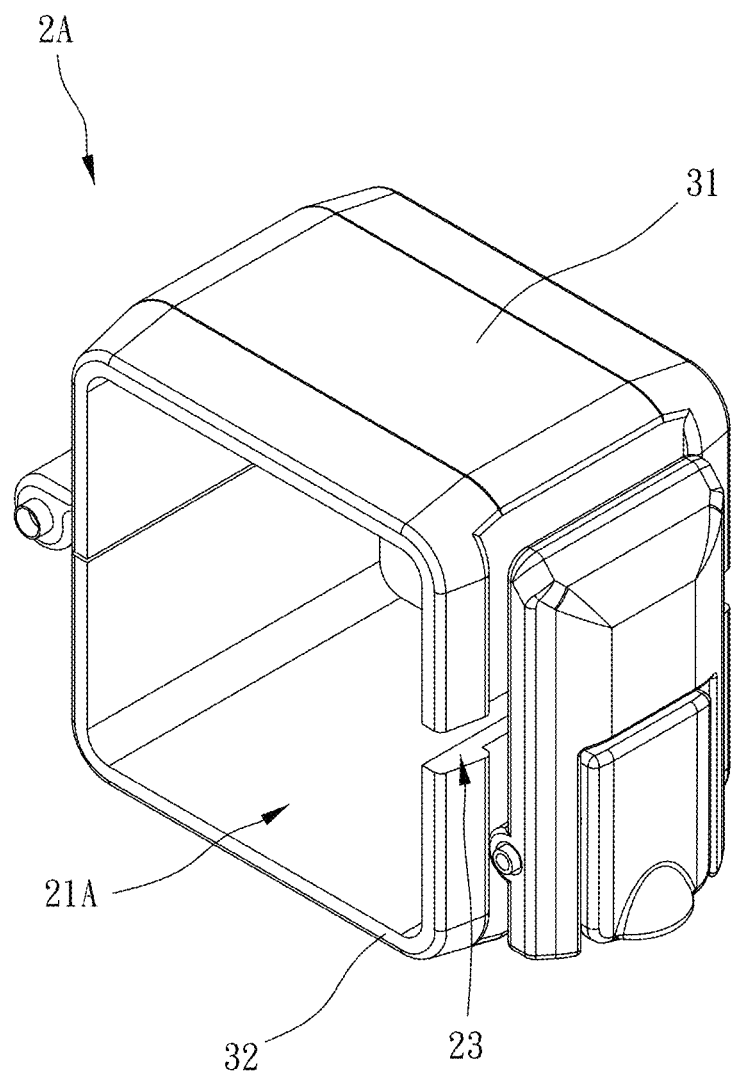
FIG. 9 is a stereogram showing a second embodiment of the present invention.
Figure 10:
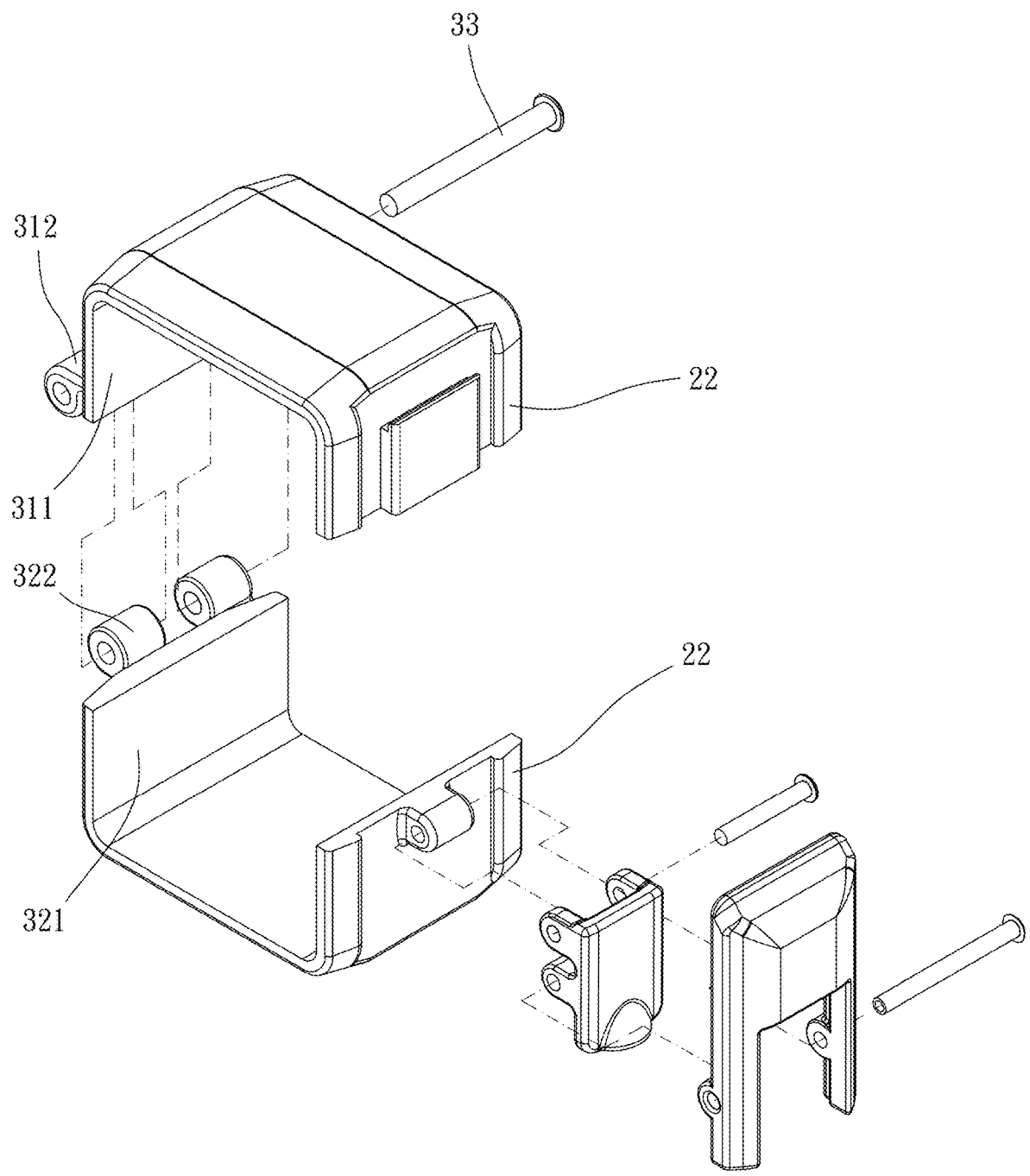
FIG. 10 is a breakdown drawing showing a second embodiment of the present invention.

In the second embodiment shown in FIG. 9 and FIG. 10, the tightening body 2A further includes a first member 31 and a second member 32. An end of the first member 31 is one of the free ends 22, and an opposite end of the first member 31 is a first connecting end 311. An end of the second member 32 is the other one of the free ends 22, and an opposite end of the second member 32 is a second connecting end 321. The first connecting end 311 is pivotally connected with the second connecting end 321 so that the first member 31 and the second member 32 are pivotable and openable with respect to each other. Thereby, the user can open the tightening body 2A to laterally connect to the connecting rod 72 which has been connected to the vehicle body 75, as shown in FIG. 6 to FIG. 8.

In the second embodiment, the first member 31 has a first pivot portion 312, and the second member 32 has a second pivot portion 322. A pivot axle 33 is inserted through the first pivot portion 312 and the second pivot portion 322 along a direction parallel to a direction along which the insertion hole 21A is opened. The pivot axle 33 is located at the direction along which the gap 23 is opened.

Figure 11:
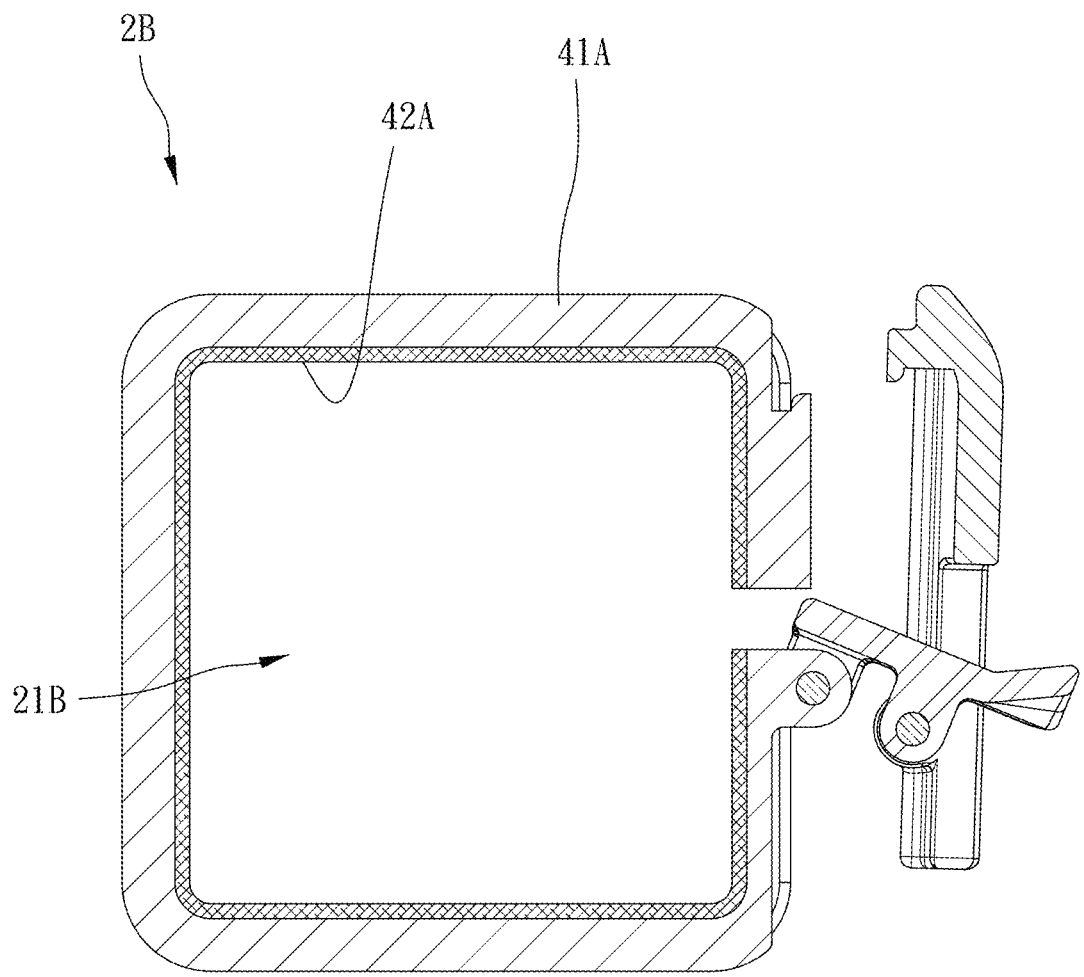
FIG. 11 is a profile showing a third embodiment of the present invention.
Figure 12:
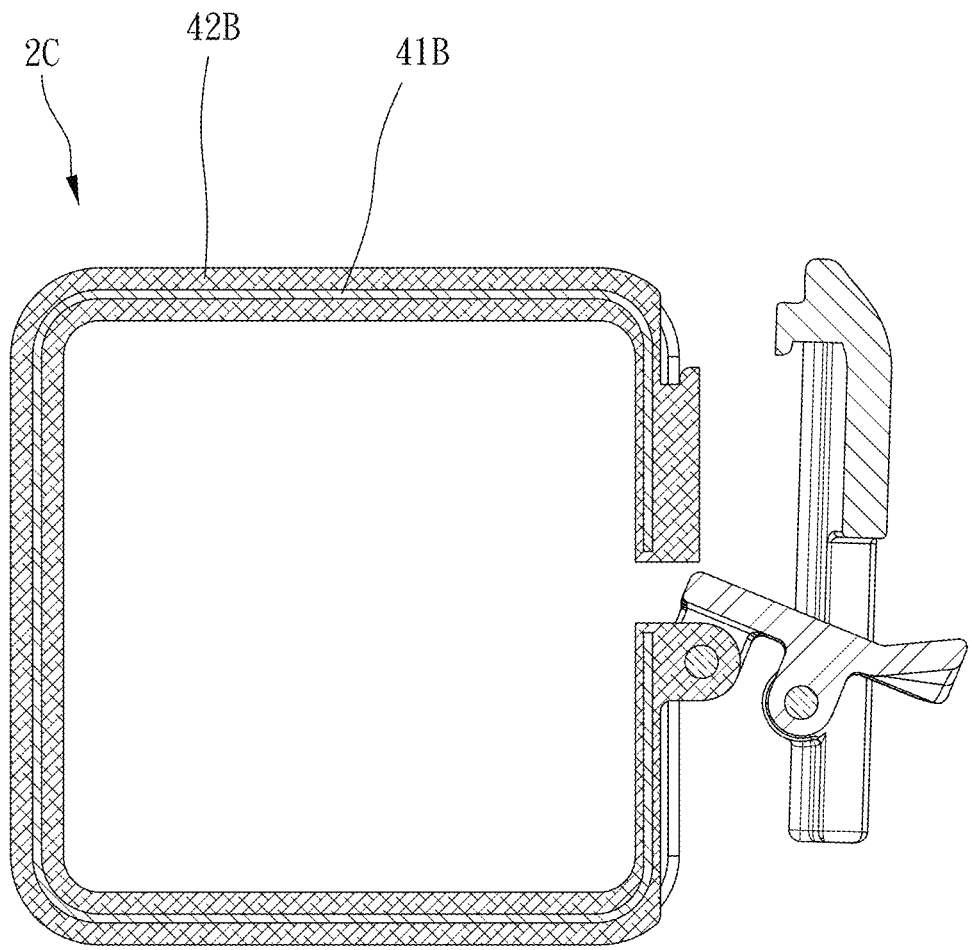
FIG. 12 is a profile showing a fourth embodiment of the present invention.

In the third embodiment shown in FIG. 11, the tightening body 2B further includes a body layer 41A and a covering layer 42A. The covering layer 42A is disposed on at least an inner wall of the body layer 41A. The covering layer 42A surrounds the insertion hole 21B for abutting against the connecting rod 72, as shown in FIG. 6 to FIG. 8. Specifically, the body layer 41A and the covering layer 42A are made of different materials, and the hardness of the body layer 41A is larger than the hardness of the covering layer 42A so that the covering layer 42A may not damage the surface of the connecting rod 72.

In the third embodiment, the covering layer 42A is disposed on only the inner wall of the body layer 41A, and the body layer 41A is separatably sleeved onto the covering layer 42A for storing or replacing.

However, in the fourth embodiment of the tightening body 2C, the covering layer 42B covers both the inner wall and the outer wall of the body layer 41B. The covering layer 42B can be formed by plastic injection molding.

The carrier 71 of the present invention includes the connecting rod 72, the positioning clamp 1 mentioned above, a main rack 73, and a carrying assembly 74. The connecting rod 72 is connected with the tube body 751 of the vehicle body 75. The positioning clamp 1 is movably sleeved onto the connecting rod 72. The main rack 73 is connected to the connecting rod 72. The carrying assembly 74 is disposed on the main rack 73 for restricting a vehicle 76, such as a bicycle.

What is claimed is:

1. A positioning clamp, for being disposed on a connecting rod of a carrier, the connecting rod being adapted for connecting to a tube body of a vehicle body, the positioning clamp including:
   a tightening body, extending along a surrounding direction, enclosing an insertion hole, the insertion hole being adapted for the connecting rod to movably insert through, two free ends of the tightening body being spacedly arranged along the surrounding direction so that a gap is formed between the two free ends of the tightening body, the gap providing the tightening body elasticity and deformability;
   a fastening assembly, disposed on the tightening body and movable between a fastening position and a release position;
   wherein when the fastening assembly is moved toward the fastening position, the two free ends of the tightening body are driven to approach each other so that the connecting rod is tightened by the tightening body; when the fastening assembly is moved toward the release position, the two free ends of the tightening body move apart so that the connecting rod is released from the tightening rod;
   wherein the fastening assembly includes a pivot seat, a coupling portion, and a buckling assembly, the pivot seat is disposed on one of the free ends of the tightening body, the coupling portion is disposed on the other one of the free ends of the tightening body, the buckling assembly is pivotally disposed on the pivot seat so that the buckling assembly is selectively coupled to the coupling portion across the gap; the fastening position is defined at a situation when the buckling assembly is coupled to the coupling portion, the release position is defined at a situation when the buckling assembly is released from the coupling portion.

2. The positioning clamp of claim 1, wherein the buckling assembly includes a control member and a buckling member, the control member has a first pivot arm and a second pivot arm, the first pivot arm is pivotally disposed on the pivot seat, the second pivot arm is pivotally connected to the buckling member; the first pivot arm is located between the second pivot arm and the coupling portion.

3. The positioning clamp of claim 2, wherein the coupling portion is formed with a coupling groove at a side thereof opposite to the gap, a part of the buckling assembly is selectively embedded into the coupling groove; the control member further includes a pulling portion, the pulling portion is adapted for being pulled to drive the control member to pivot, the second pivot arm is located between the pulling portion and the first pivot arm; a distance between a pivot axis of the first pivot arm and a pivot axis of the second pivot arm is defined as a first distance, a minimum distance between the two free ends before deformation is defined as a second distance, the second distance is 0.55-0.7 time the first distance.

4. The positioning clamp of claim 1, wherein the tightening body includes a body layer and a covering layer, the covering layer is arranged on at least an inner wall of the body layer, the covering layer surrounds the insertion hole to abut against the connecting rod.

5. The positioning clamp of claim 4, wherein the body layer is removably sleeved onto the covering layer.

6. The positioning clamp of claim 4, wherein the covering layer covers the inner wall and an outer wall of the body layer.

7. A carrier, including:
a connecting rod, being adapted for connecting to a tube body of a vehicle body;
the positioning clamp of claim 1, the positioning clamp being movably sleeved onto the connecting rod;
a main rack, connecting to the connecting rod;
a carrying assembly, disposed on the main rack, being adapted for restricting a vehicle.

8. A positioning clamp, for being disposed on a connecting rod of a carrier, the connecting rod being adapted for connecting to a tube body of a vehicle body, the positioning clamp including:
a tightening body, extending along a surrounding direction, enclosing an insertion hole, the insertion hole being adapted for the connecting rod to movably insert through, two free ends of the tightening body being spacedly arranged along the surrounding direction so that a gap is formed between the two free ends of the tightening body, the gap providing the tightening body elasticity and deformability;
a fastening assembly, disposed on the tightening body and movable between a fastening position and a release position;
wherein when the fastening assembly is moved toward the fastening position, the two free ends of the tightening body are driven to approach each other so that the connecting rod is tightened by the tightening body; when the fastening assembly is moved toward the release position, the two free ends of the tightening body move apart so that the connecting rod is released from the tightening rod;
wherein the tightening body further includes a first member and a second member, an end of the first member is one of the free ends, an opposite end of the first member is a first connecting end, an end of the second member is the other one of the free ends, an opposite end of the second member is a second connecting end, the first connecting end is pivotally connected to the second connecting end so that the first member is pivotable with respect to the second member.

9. The positioning clamp of claim 8, wherein the first member has a first pivot portion, the second member has a second pivot portion, a pivot axle is inserted through the first pivot portion and the second pivot portion along a direction parallel to an extending direction of the insertion hole; the pivot axle is located at a direction along which the gap is opened.

* * * * *